J. T. WILLIAMS, DEC'D.
E. M. WILLIAMS, ADMINISTRATRIX.
CANDY WRAPPING MACHINE.
APPLICATION FILED DEC. 1, 1910.
1,046,526.
Patented Dec. 10, 1912.
4 SHEETS—SHEET 1.
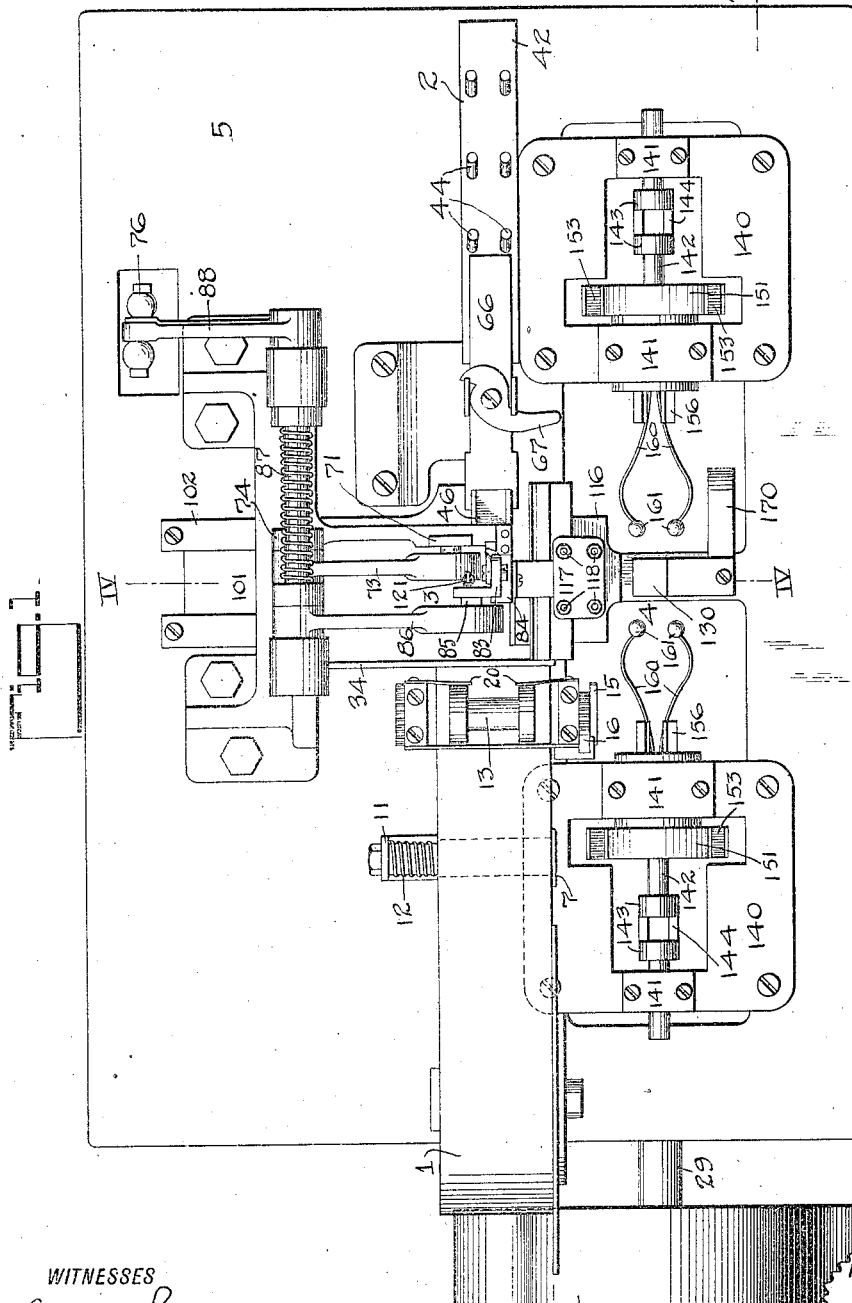
WITNESSES
Geo. A Senior
Grace T. Lyon
INVENTOR
John T. Williams
by Aus Proctor
ATTORNEY

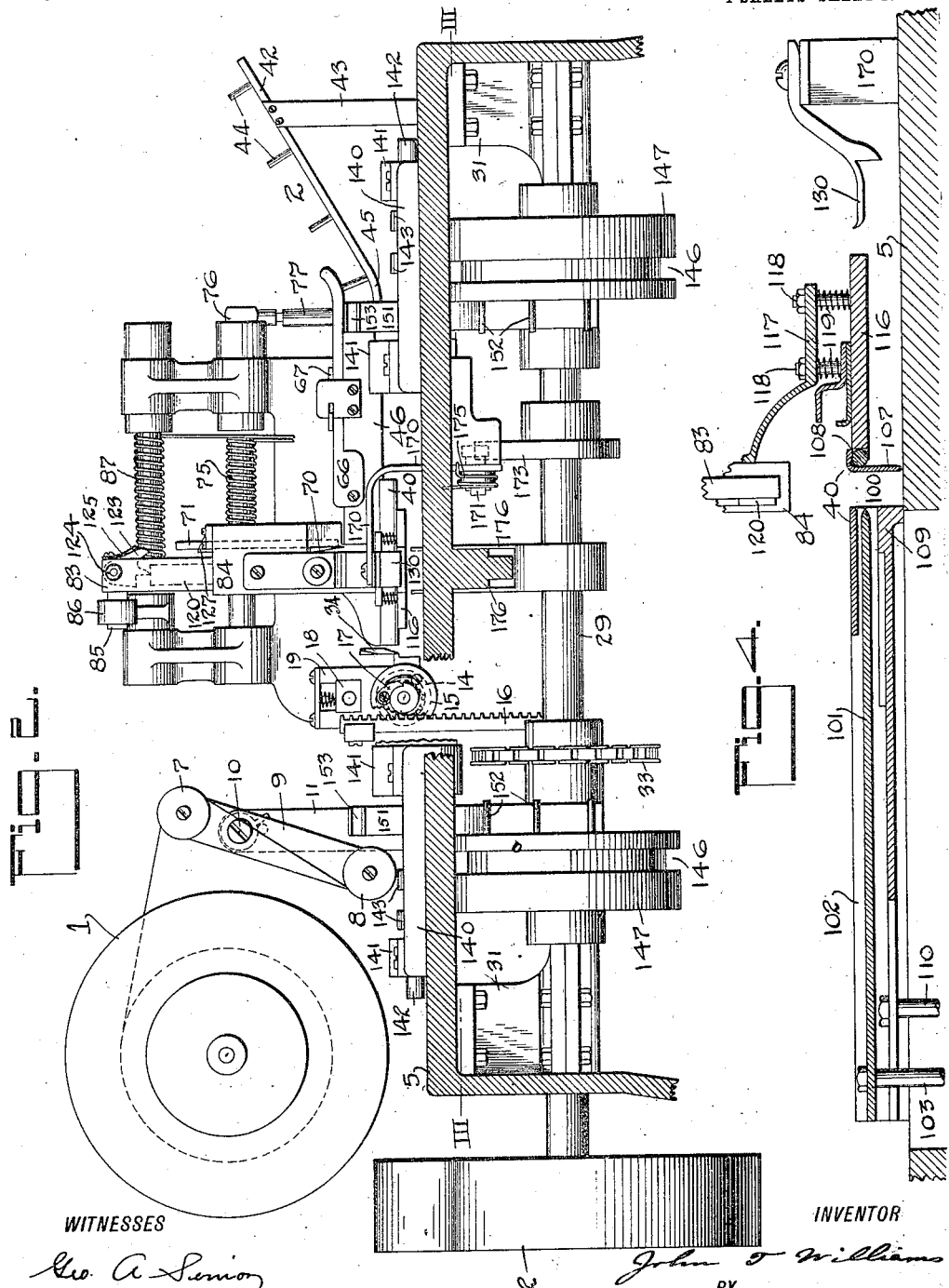

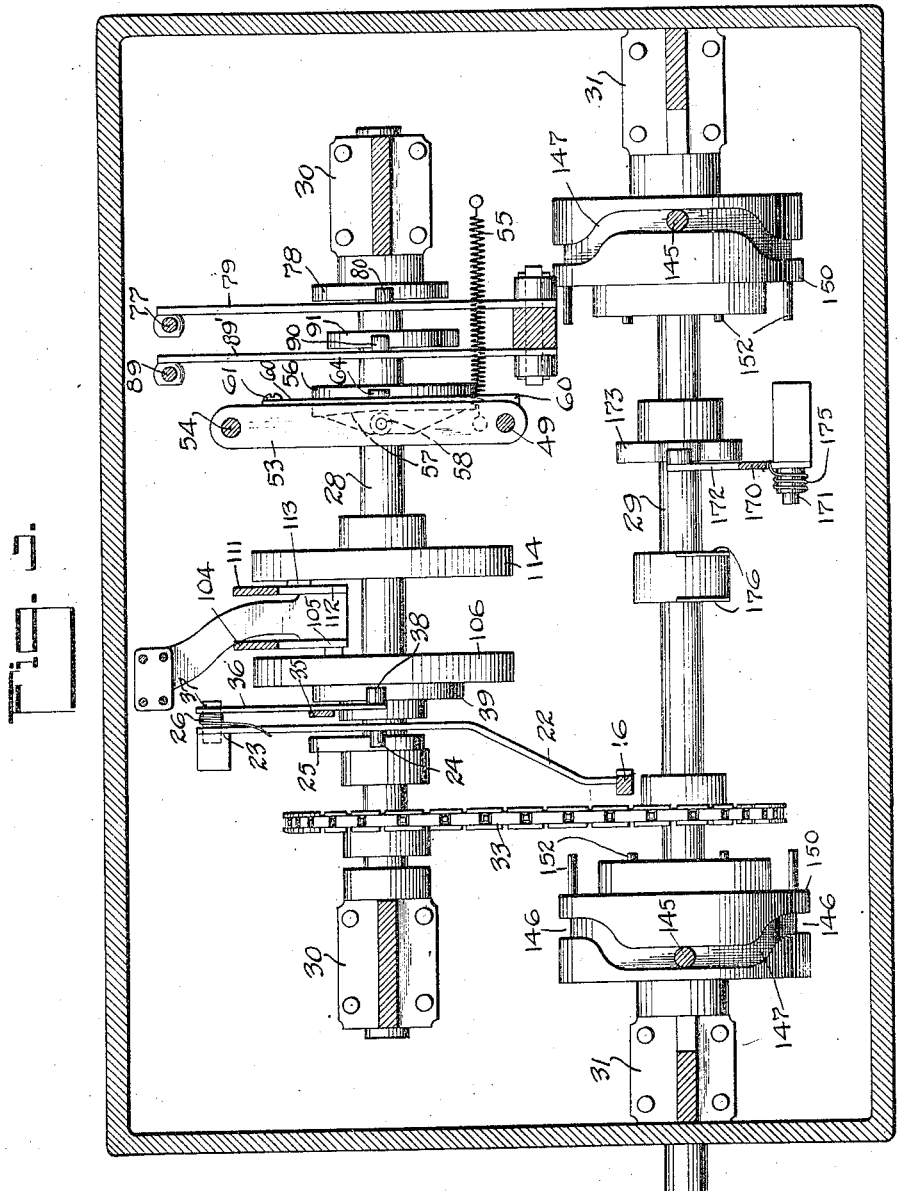

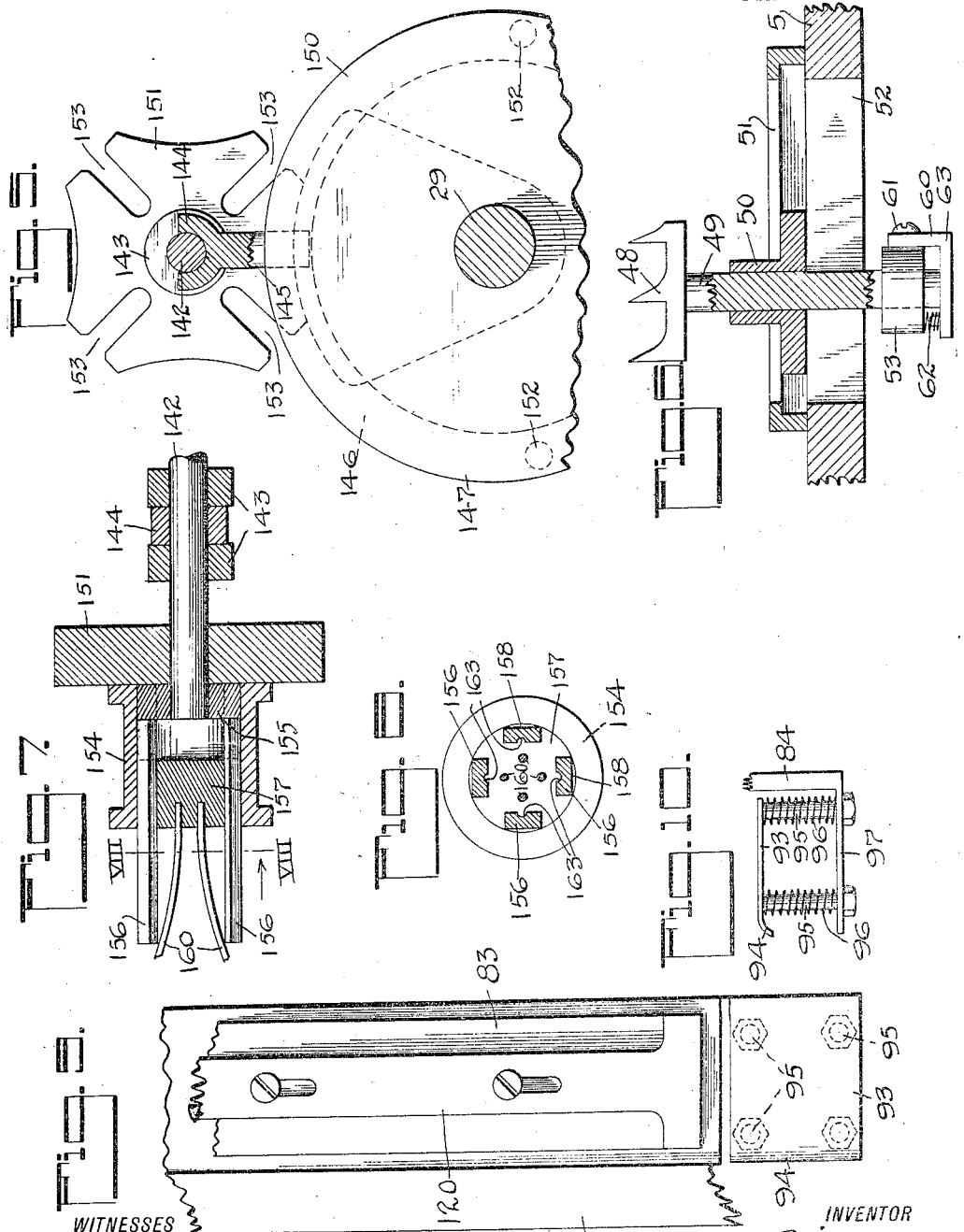

UNITED STATES PATENT OFFICE.

JOHN T. WILLIAMS, OF BROOKLYN, NEW YORK; EDITH M. WILLIAMS, OF BROOKLYN, NEW YORK, ADMINISTRATRIX OF SAID JOHN T. WILLIAMS, DECEASED, ASSIGNOR TO AGNES C. WILLIAMS, OF MOUNT VERNON, NEW YORK.

CANDY-WRAPPING MACHINE.

1,046,526.  Specification of Letters Patent.  Patented Dec. 10, 1912.

Application filed December 1, 1910. Serial No. 595,064.

*To all whom it may concern:*

Be it known that I, JOHN T. WILLIAMS, citizen of the United States, residing at Brooklyn, in the county of Kings and State of New York, have invented a new and useful Improvement in Candy-Wrapping Machines, of which the following is a specification.

This invention relates to machines for wrapping candy and similar products, in which the article wrapped is neatly inclosed in a tubular formed wrapper, the latter being closed at the ends by twisting such ends a turn, more or less, on a longitudinal axis of the article.

More particularly the invention relates to a machine in which the wrapper for the candy is folded or formed in the tubular outlines inclosing the candy, while in one position, and on one line or axis of movement, the tubular wrapper with its inclosed candy being then transferred laterally to another position or axis where the ends are twisted. From this position the completely wrapped candy or article is ejected.

One object of the invention is to increase the speed and improve the output as compared with other candy wrapping machines.

Another object is to provide for positiveness, simplicity and certainty in the operation.

A still further object is to provide a mechanism all the parts of which are readily accessible for inspection, removal or repair.

The invention relates to an improved candy wrapping machine of the character mentioned.

With the above and various other objects in view the invention consists in the features of construction, combination, location and arrangement, as hereinafter set forth.

In the drawings, Figure 1, is a top plan view of a candy wrapping machine embodying the principles of my invention. Fig. 2, is a vertical sectional view of the same taken generally on the line II—II of Fig. 1, looking backward in the machine, *i. e.* in the direction of the arrows; Fig. 3, is a horizontal sectional view taken generally on the line III—III of Fig. 2 looking downward; Fig. 4, is a detail sectional view on the line IV—IV of Fig. 1; Fig. 5, is a detail end elevation of what I term the "Geneva gear" employed in the machine; Fig. 6, is a detail sectional view of the candy feeding device employed in this machine; Fig. 7, is a longitudinal sectional view of one of the appliances for twisting the wrapper; Fig. 8, is a section on the line VIII—VIII of Fig. 7, looking in the direction of the arrow; Fig. 9, is a detail side view of a plunger or part for pushing the candy downward at a certain stage of the operation, and Fig. 10, is a detail plan view of a spring plate employed for holding the candy.

Referring to the drawings, 1 denotes a paper reel, and 2 an inclined article supply chute constituting the best form of article supply chute or article feed.

3 denotes generally agencies in the machine for the service or purpose of cutting off a piece of wrapping paper, cutting off a piece of candy, depositing the candy on the wrapper and bending the latter into U-shape. At this same point of location in the machine are first and second folders for folding the two edges of the wrapper on the article and lapping one fold over the other. At this same point in the machine is also arranged a carrier or ram for transferring the article, partly wrapped as above described, transversely to a new axis of position where it is again arrested and temporarily held. This new position is generally indicated at 4.

In the best construction embodying the invention, there will be provided a horizontal table 5 which serves as a frame or support for all the mechanism. Also in the best embodiment the paper web or strip will be guided over tension devices and then fed horizontally in a certain direction across the table. The candy, strip or articles to be wrapped are at the same time guided so as to approach the advancing paper web along the same general path or line but in opposite directions. For the purpose of tensioning the web, I have illustrated rolls 7, 8, mounted on a swinging arm 9 which is pivoted at 10 to an upright 11 from the frame or table 5. The arm is impelled rotatively to equalize the strain on the web by a spiral spring 12. It is characteristic of the arm 9 which tensions the web that it normally holds the web in a zig-zag path so as to take up any slack therein, the tension of the spring 12 being in a direction to accomplish this. It is further characteristic of the arm 9 that any sudden movements of the web may take place by swinging the arm 9 rather than by an abrupt pull of the reel 1, so that the paper is not likely to be torn on account of any inertia or resistance to rotation that the reel may have. In fact it acts as an equalizer to prevent any sudden or undue strain on the paper.

The machine will further include means for intermittingly feeding the web, and in accordance with the embodiment of the invention shown, there is provided a pair of coöperating feed rolls 13, 14, (see Figs. 1 and 2). For clearness roll 13 is omitted in Fig. 2. One of the rolls 14 is intermittingly rotated by a loose end cap or disk 15 having a pinion in mesh with the ertically moving rack 16.

17 denotes a ratchet and pawl connection between the disk 15 and the roll 14 by which only forward or righthanded rotation of the disk is communicated to the roll. The upper roll 13 is maintained pressed against the lower roll by spring depressed bearings 18 in the frames 19.

20 designates scrapers fixed to the frame 19, and bearing against the peripheral portion or portions of the roll 13 so as to remove any wax or adhesions thereto.

The rack 16 may be conveniently given its vertical movement by an arm 22 pivoted at 23 on the upper side of the table 5. Such arm 22 has a pin 24 maintained against a cam 25 by a spring 26. As illustrated in Fig. 3 the under side of the table 5 has two cam or driving shafts 28, 29, respectively in bearings 30, 31.

32 designates a driving pulley for tne shaft 29, and 33 a sprocket chain by which the shaft 28 is rotated from the shaft 29 and at the same speed.

I provide shears, knives, or cutters for cutting off sheets or pieces from the web. 34 is a knife blade pivoted on the frame of the machine and having a link connection 35 with an arm 36 pivoted at 37, and having a pin 38 maintained in contact with the cam 39.

By the construction above described, a portion of the web is adapted to be fed out on a shaft or table 40 and a piece of proper length thereupon cut off so as to remain located on such shelf or table 40.

The article feed or article supply chute may vary in construction, but in the embodiment shown, comprises an inclined metal strip 42 supported on a standard 43 from the table 5 and having a plurality of pins 44 in parallel rows on both sides so as to form a central region through which a strip of candy may be fed. This chute or guide has a bent portion 45 beyond which the chute extends horizontally into a trough 46 where there is a feeding device for the candy. In practice I provide a four-motion feed for the strip of candy, and in the best practical construction I provide a toothed gripper 48 (see Fig. 6) on a vertical rod, or stem 49 splined in the block or shoe 50, which runs in a longitudinal slot 51—52 in the table 5.

53 denotes a lever pivoted at 54 beneath the table and swinging in a horizontal plane, being impelled to the right in Fig. 3 by a spring 55.

56 denotes a cam on the shaft 28, and having a cam side face 57 coöperating with a roller 58 on the lever 53. 60 denotes another lever or arm pivoted at 61 to the lever 53 and swinging in a vertical plane, being normally spring-pressed downward by a spring 62 (see Fig. 6). The lever 60 has a portion 63 extending under the stem 49 of the toothed gripper 48.

64 denotes a roller on the lever 60 engaging the cam 56.

By suitably shaping the cams 56 and 57 it is possible to give the toothed gripper 48 a movement corresponding to a four-motion feed. The prongs rise, enter the candy, push the candy strip positively to the left in Fig. 1, then descend and move to the right idly ready to ascend and again grip and feed the candy.

66 denotes a cover on the guide or box 46, which is normally locked in place by a latch 67.

In accordance with the best practical embodiments of the invention, the candy strip is cut into lengths as it issues from the guide or box 46. The constructions for this purpose may vary in practice, but will ordinarily include a vertically movable knife or cutter 70 which is attached to a cross-head 71 which is caused to descend as later described.

73 denotes an arm pivoted at 74 and fixed to a rock-shaft 75 which is positively oscillated at proper intervals by a crank 76, rod 77, and a cam connection 78. The rod 77 being pivoted to a lever 79 having a pin 80 bearing on said cam 78. In this way the knife or cutter 70 is caused to reciprocate vertically and cut off pieces or blocks of candy.

It is part of the service of the machine that the candy is displaced onto the wrapper after being cut off. The best constructions embodying the invention will therefore provide a displacer the construction of which may vary, but will ordinarily include a bar or vertically movable plunger 83 guided in a frame-bar 84 and having a pin 85 connected to a lever 86. The latter forming a part of the rock-frame 87 positively oscillated by a crank 88 having a rod 89 which descends through the table 5 and is connected to a lever arm 89¹ and is oscillated by a pin 90 bearing on a cam 91 of the shaft 28. At the proper time this plunger 83 descends so as to push a block of candy or article downward onto the wrapper which has been positioned on the table or ledge 40, as above described.

I provide means for holding the block of candy or article temporarily until it is proper that the wrapper should receive it. For this purpose I make use of a holding finger and in my preferred construction make use of a plate 93 with a rounded end 94 toward which the candy strip feeds and rigid pins 95 with springs 96, said pins passing loosely through a plate 97 forming part of the frame 84. By this construction the plate 93 is held and definitely located or positioned in a proper way to receive the candy against the face 93, and this plate or face will act to hold the candy temporarily against the opposite wall of the case 46 which is continued into the frame 84 for this purpose. The descent of the plunger 83 finally depresses the article out of its frictional engagement as held by the plate 93. The depressor or bar 83 is adapted in pressing the article onto the wrapper to bend the latter into U shape so that the two side edges stand upward vertically. For this purpose I arrange an opening 100 (see Fig. 4) beneath the wrapper on the ledge or table 40 so that the article and wrapper are pushed into the opening 100 and bent into U form. The article with its wrapper are furthermore so located as to permit the first and second fold.

101 denotes a folding ram guided to be projected across the partly wrapped article and starting the first fold. For this purpose the ram 101 is guided in a frame 102.

103 denotes a pin projecting downward from the ram 101 and secured to a lever 104 pivoted at 105 and having a pin working in a groove or box-cam 106.

It is evident that the ram 101 is adapted to be projected across the article and complete the first fold of the wrapper.

107 and 109 denote the second folders.

107 is an apron pivoted at 108 and spring-pressed or held in the position shown.

109 denotes a ram or pusher having a movement toward its co-acting folder 107. This movement commencing and continuing after the ram 101 has been projected to its limit. In this way the article is pushed under the second folder and the second fold of the wrapper completed.

110 denotes a pin projecting downward from the ram 109 and engaging a lever 111 pivoted at 112 to a part of the frame, said lever having a pin 113 working in the face of a groove or box-cam 114.

The second co-acting folder 107 is mounted on a plate 116 which is spring-held from a part of the main frame 117 by pins 118 which project rigidly from the plate 116 and loosely through holes in the frame-plate 117. 119 are springs surrounding the said pins.

In order to hold the article properly depressed with the wrapper in U-form in the opening 109 and still not interfere with the movement of the first folder 101, I provide a two part plunger for depressing the articles on the wrapper and holding the wrapper in U form. In practice the construction of this part or mechanism will vary, but in the best embodiment there will be provided a second bar 120 guided alongside the plunger 83 and having vertical movement adjacent thereto. This second bar 120 is normally elevated by a spring 121, but will be vertically depressed with the plunger 83 by a finger 123 pivoted at 124 to the plunger 83 and spring-pressed inward by a spring 125. When the plunger 83 descends, the finger 123 strikes against the tappet 127 and is so displaced as to permit the bar 120 to rise. The location of the bottom of the bar 120 is such that as it rises it makes a place for the folder blade 101 to pass over the top of the article and start the first fold. After the first fold is once well started it becomes unnecessary for the plunger 83 to remain long depressed, and this plunger 83 is accordingly raised out of the way. The first fold is then at once completed and the second fold commenced by the movement of the ram 109 toward the right. The ram or pusher 109 continues its movement toward the right, completing the second fold and smoothing or ironing the same by the action of the plate 116. The pusher also constitutes a carrier in accordance with this embodiment of the invention and carries the article to an arrester or holder 130 where it stops in position for a new action. The wrapper is now tightly shaped in tubular form around the article, and being held by the arrester 130 is adapted to have the ends twisted which occurs as I will now describe.

According to the best construction embodying the invention, there will be provided two shafts rotating in alinement with one another and in the same direction of rotation, both shafts having twisting fingers which are so actuated as to properly close on the projected ends of the tubular wrapper, and thereupon to so turn or twist the same as to make a neat attractive package of wrapped candy. During this operation the candy is held on a table or narrow ledge so as to give adequate space at each side for the engagement of the twisting fingers, which in practice I make with rounded or balled protuberances mounted on yielding or springing arms. In accordance with the embodiment of the invention shown, there are provided two bearing plates or frames 140 each having two bearings or journals 141 in which are rotatively received the twister shafts 142.

143 denotes a pair of collars on each twister shaft, and between the collars of each pair there extends downward a fork or yoke 144. The lower end of this yoke or fork is rounded to constitute a pin 145 which extends into the groove 146 of cams 147 on the shaft 29. The shape of the groove 146 is such as to impart a to and fro movement to the pin 145 and thereby to the collars 143 and the twister shaft 142. In this way both twister shafts are made to simultaneously approach and recede from one another at intermittent intervals in the action of the machine.

Means are provided for imparting rotation to the twister shafts, and will in the best form of the invention comprise intermeshing gears 150, 151 which are so operated as to cause a rotation of the gear 151 only during a portion of the rotation of the gear 150. This is conveniently accomplished by pins 152 of the gear 150 which coöperate with slots 153 of the gear 151. As illustrated the gear 151 makes a complete rotation during about one-half a revolution of the gear 150 and then remains at rest during the other half of a revolution of the gear 150. It is of course evident that any form of mutilated gear, other than the Geneva stop gear shown, will answer for transmitting the required rotation. The gear 151 which rotates the twister shaft 142 is not tight on said shaft, but is fixed to a collar 154 within which is located a sliding block 155 with pins 156, this block 155 being fixed to the twister shaft 142. Fixed within the collar 154 is another block or plug 157 with slots 158 in its periphery which guide the rods 156 already mentioned and which are fixed to the block 155 and twister shaft 142.

160 are spring wires projecting from the block 157 and having balls or rounded protuberances 161 at their extremities. The wires 160 spread outward or diverge from one another in the radial planes of the rods 156, and the latter are grooved at 163 on their interiors so as to engage the spring wires 160. The forward movement of the block 155 will accordingly move the bars 156 to the left in Fig. 7, and the grooved extremities of these pins or bars will impinge on the spring wires 160 and bend or deflect such spring wires inward toward one another. This movement together with the rotation imparted to the collar 154 by the gear 151 will cause the balls 161 to grasp and twist the ends of the tubular wrapper. During this time the article has been held in place on the ledge or table 5 by the holder or arrester 130 which in turn is supported by an arm 170 pivoted at 171 and having an extension 172 engaging a cam 173. The rotation of the cam 173 displaces the arm 172 and thereby lifts the holder or arrester 130 against the tension of its spring 175. The lifting of the holder 130 will permit the article to be removed or ejected in any suitable way. A form of ejector comprises, in the best embodiment of the invention, a pair of arms 176 fixed to the shaft 29 and rotating upward through the table 5 on either sides of the ledge on which the wrapped article at this time rests. These arms will engage the twisted ends of the wrapper and thereby throw the article forward and out of the machine.

It will be understood that I do not desire to limit myself to the particular features of construction as herein shown, since variations embodying the principles of the invention may be made without departing from the spirit and scope thereof.

What I claim is:—

1. In a candy wrapping machine, a table having a pair of parallel shafts on its under side, a sprocket chain connecting said shafts, a pair of yokes operatively connected to one of said shafts and given a longitudinal movement thereby, twisting fingers rotated from said shaft and given a longitudinal movement by said yokes, said twisting fingers having an axis of rotation substantially level with the surface of said table, and means actuated by said second shaft for displacing an article on the table laterally to a position between said twisting fingers.

2. In a candy wrapping machine, a table, means for moving a piece of candy laterally on said table, a pair of twisting shafts in alinement with one another and with said article, and spring fingers having balls collapsible about the wrapper, said balls resiliently engaging the wrapper and having a rotative movement.

3. In an article wrapping machine, the combination of an article feed, a wrapper feed, a holding finger laterally pressed against the article, a two-part displacer for pushing the article on to the wrapper, means for transferring and folding the wrapper into tubular form, an arrester for the partly formed package, and a twister for twisting the ends of the tubular wrapper.

4. In a candy wrapping machine, a table, a paper feed and an article feed substantially parallel to the top of said table and in opposite directions, a plunger moving vertically with respect to said table for depressing the article onto the wrapper, a slide resting on the table and moving in a direction at right-angles to the article and wrapper feed, said slide engaging the depressed article to push it sidewise, means coöperating with said slide to partially complete the fold of the wrapper, and a pair of twisting shafts, rotating on an axis parallel to the direction of the wrapper and article feeds, and in a plane substantially level with the surface of said table.

5. In a candy wrapping machine, a table, a pair of shafts beneath the table, an article and wrapper feed in substantial alinement with one another across the middle of the table, a two-part folder having a movement across the table, a pair of cams on one of said shafts, separate connections therefrom for moving said two-part folder, a pair of twisting axles substantially level with the surface of the table, connections with the other of said shafts for rotating said twisting axles, and means for clamping the article temporarily on the surface of the table while the same is being wrapped.

6. In an article wrapping machine, a twister comprising a block 157 with spring prongs 160 and a bearer with longitudinally displaceable bearing rods 156 fixed thereon.

7. In an article wrapping machine, the combination of a continuous strip feed, a wrapper feed, a knife for cutting off articles from the continuous strip, a spring pressed holding finger for the article, and a two-part displacer for pushing the article onto the wrapper.

In testimony whereof, I have signed my name to this specification in the presence of two subscribing witnesses, this 30th day of November 1910.

JOHN T. WILLIAMS.

Witnesses:
CHAS. T. LUTHER,
R. FRANKEL.